(12) United States Patent
Lustenberger et al.

(10) Patent No.: US 6,327,913 B1
(45) Date of Patent: Dec. 11, 2001

(54) FORCE MEASURING CELL WITH AN OSCILLATING STRING TRANSDUCER

(75) Inventors: Martin Lustenberger, Villars-sur-Glâne; Johannes Wirth, Zürich, both of (CH)

(73) Assignee: Digi Sens AG, Murten (CH)

( * ) Notice: Subject to any disclaimer, the term of this patent is extended or adjusted under 35 U.S.C. 154(b) by 0 days.

(21) Appl. No.: 09/530,475

(22) PCT Filed: Oct. 4, 1999

(86) PCT No.: PCT/CH99/00467

§ 371 Date: Sep. 20, 2000

§ 102(e) Date: Sep. 20, 2000

(87) PCT Pub. No.: WO00/03218

PCT Pub. Date: Jan. 20, 2000

(30) Foreign Application Priority Data

Oct. 30, 1998 (CH) .................................................. 2194/98

(51) Int. Cl.[7] .................................................. G01B 5/00
(52) U.S. Cl. .................................................. 73/778
(58) Field of Search .............................. 73/774, 778, 787, 73/788, 789

(56) References Cited

U.S. PATENT DOCUMENTS

| | | | | |
|---|---|---|---|---|
| 3,862,569 | * | 1/1975 | Lucas et al. ........................... 73/778 |
| 4,420,755 | * | 12/1983 | Primbs, Jr. ....................... 340/870.38 |
| 5,095,764 | * | 3/1992 | Saner ................................ 73/862.59 |
| 5,478,975 | * | 12/1995 | Ford ................................ 177/210 FP |
| 5,710,426 | * | 1/1998 | Reed et al. ........................ 250/237 G |

* cited by examiner

Primary Examiner—Max Noori
(74) Attorney, Agent, or Firm—Jenkens & Gilchrist, P.C.

(57) ABSTRACT

The inventive force measuring cell consists of a plate (2) which is provided with a circular hole (2), the axis of which is perpendicular to the surface of said plate (2) and to the direction of the force that is to be measured. Said axis also lies within the neutral surface of the plate (2). The plate (2) can also be the web of a carrier. A measuring transducer (12) is inserted into the hole (3) in order to measure any modification of the size of the diameter of said hole (3) on a plane that is inclined at an angle of 45° counter to the direction of the force (F) to be measured. A lateral force is created in the direction of y in addition to a transverse stress $\tau$ with a component $\tau_{xy}$ by applying force in the direction of y when at least one side of the plate (2) is clamped in the base. The originally circular hole (3) is deformed into an ellipse. The measuring transducer (12) consists of a measuring transformer with an oscillating string.

45 Claims, 4 Drawing Sheets

FORCE MEASURING CELL WITH AN OSCILLATING STRING TRANSDUCER

Figure 1:
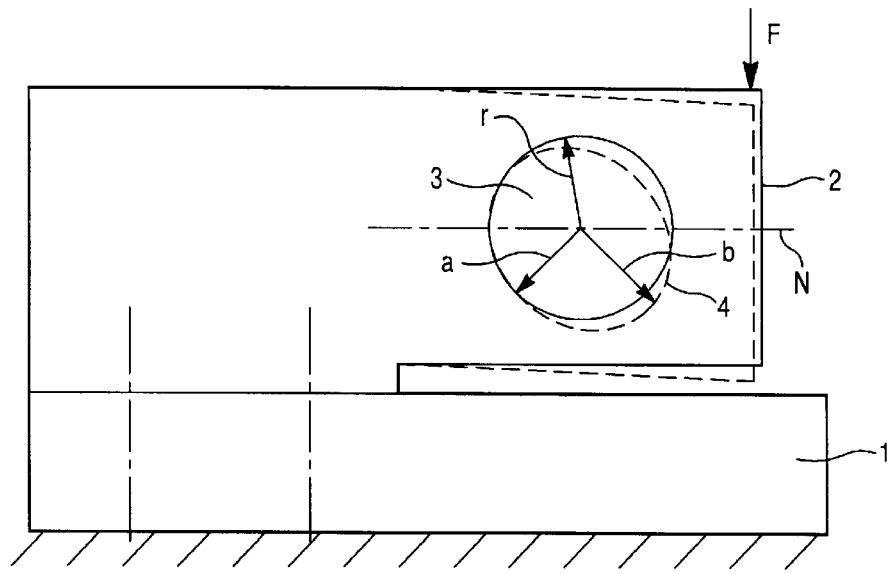

The present invention relates to a force measuring cell with an oscillating string measuring transducer. It especially relates to force measuring cells, in which the measuring transformer is set into a circular hole in a plate or a web of a carrier, whereby the axis of the hole is arranged perpendicular to the load direction and parallel to the neutral surface of the plate or the carrier.

Many such force measuring cells are known, thus for instance from GB-A1,518,359 (D1), EP-A1 0 675 032 (D2), U.S. Pat. No. 3,132,319 (D3), U.S. Pat. No. 4,530,245 (D4), EP-A1 0 129 331 (D5), U.S. Pat. No. 3,906,788 (D6). A common feature of all the quoted publications is the use of strain gauge strips (DMS) as analog measuring transformers, which are connected into bridge circuits in a known manner. In D1 the measuring transformer is glued into the hole, in D3, D4, DS it is pressed in, in the axial direction, only in D2 and D6 are defined contact points or lines provided.

Whilst D2 works with the effect of the compression cone and is therefore consequently applied only as a railway axle counter, in D3, D5, D6 the tensile force applied to a rod or plate formed element is measured as a function of the changing of the shape of the hole parallel or perpendicular to the effective force. Due to the method of fitting, the DMS transducer into the hole, only relatively modest accuracies, made up of resolution and reproducibility, are to be expected in so far as the known devices are to be used for force measurement—with the exception of D2 and D6. The replacement of a defective pressed in or glued in measuring transformer is difficult and expensive and brings with it the reworking of the hole in any case. This, in combination with the known limitations of DMS such as temperature dependence, sensitivity to humidity and variable quality of glue positions with sudden, age dependent failures especially under rough operation.

In the application of such measuring cells as railway weighing scales, in which the carriers, whose deformation is to be measured, are indeed the railway tracks, in the use of DMS a problem can arise which should not be underestimated: if the DMS is attached directly to a part of such a rail, then it is almost impossible to provide the conditions of humidity, cleanliness and temperature reproduceably on an already laid rail, which are required for the gluing on of the DMS. As an alternative, there remains the removal and welding in again of a piece of rail, which makes the production of such a weighing device enormously expensive. Additionally, in the event of a failure of the DMS the whole process must be repeated. The aim of the present invention is the production of a measuring cell for force, which can be produced easily and cost effectively, facilitates a high accuracy of the measured values, has high durability even in rough operation and can be installed and if necessary replaced with only a small outlay.

The addressing of the stated aim is given in the appended claims, with respect to the essential features and further advantageous developments.

Figure 2:
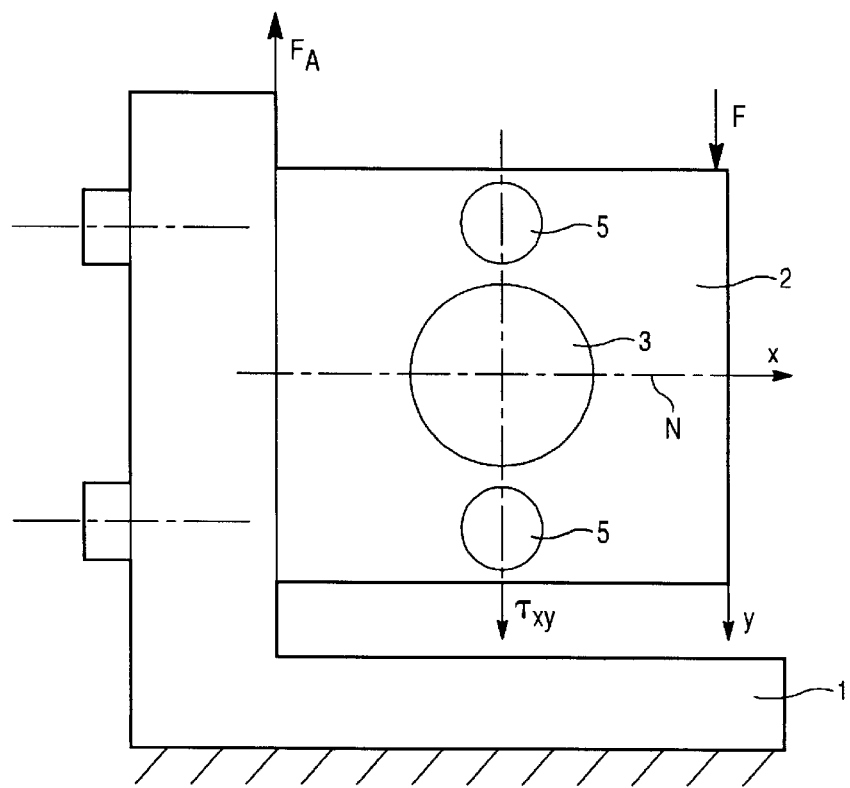
Figure 3A:
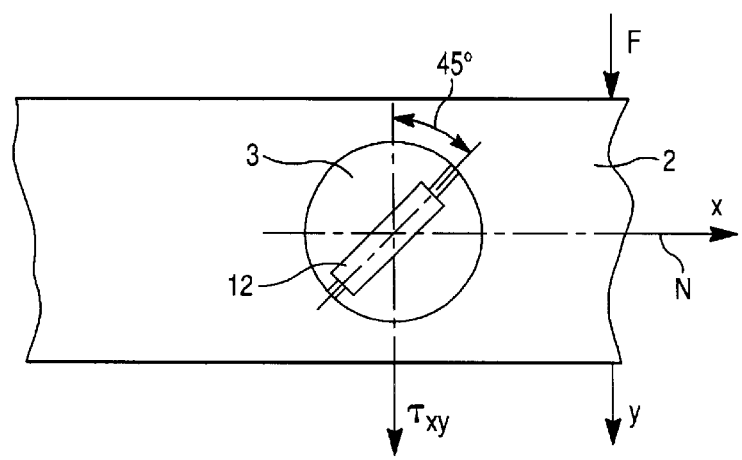
Figure 4:
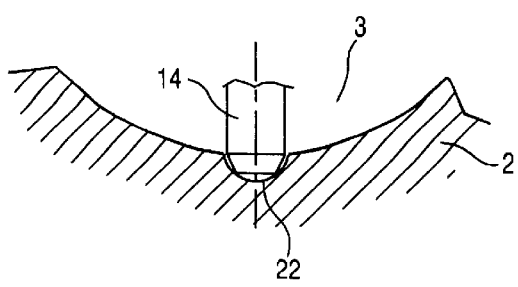
Figure 6:
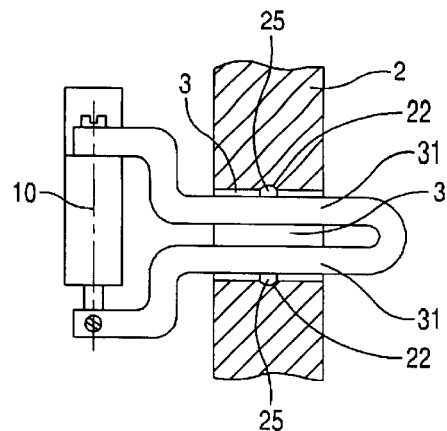
Figure 5:
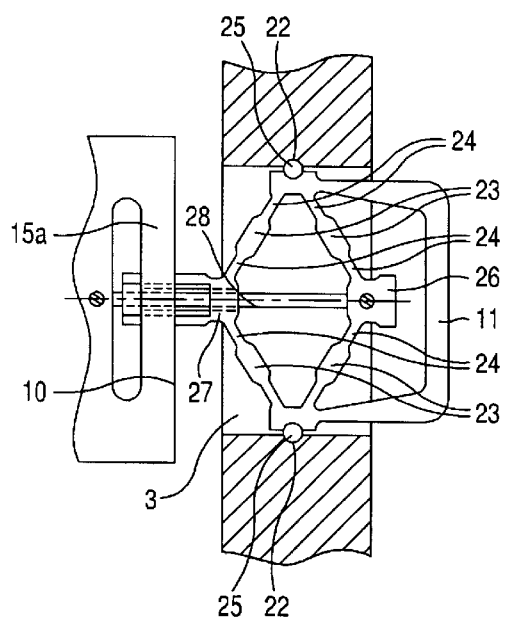
Figure 9:
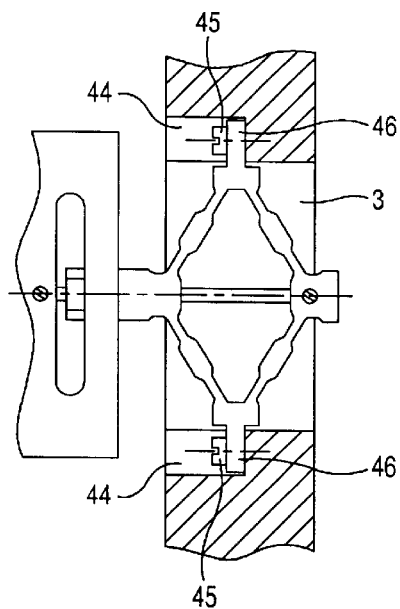
Figure 7:
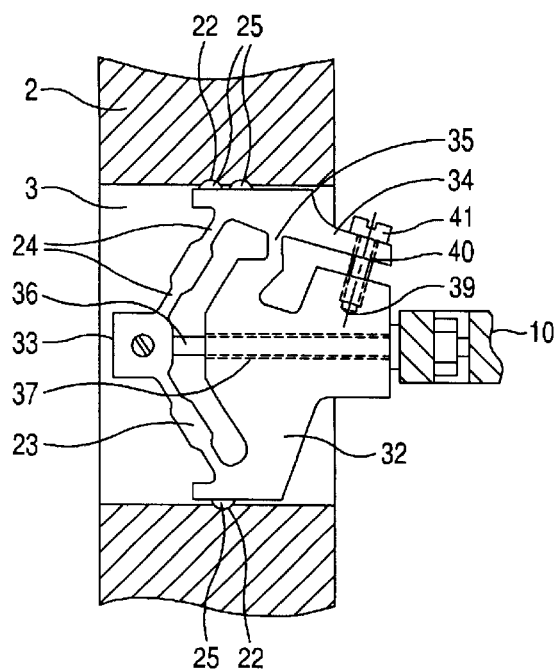
Figure 8:
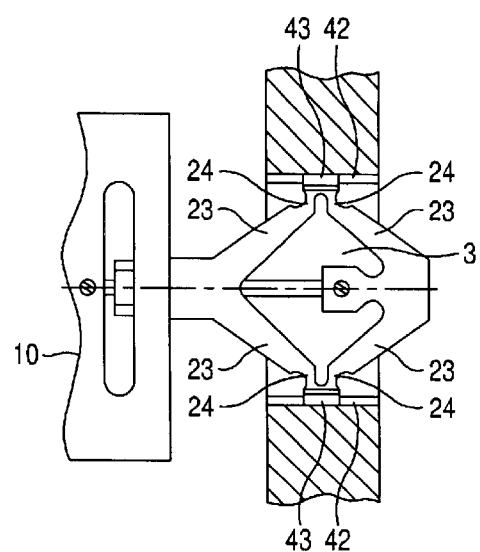
Figure 10:
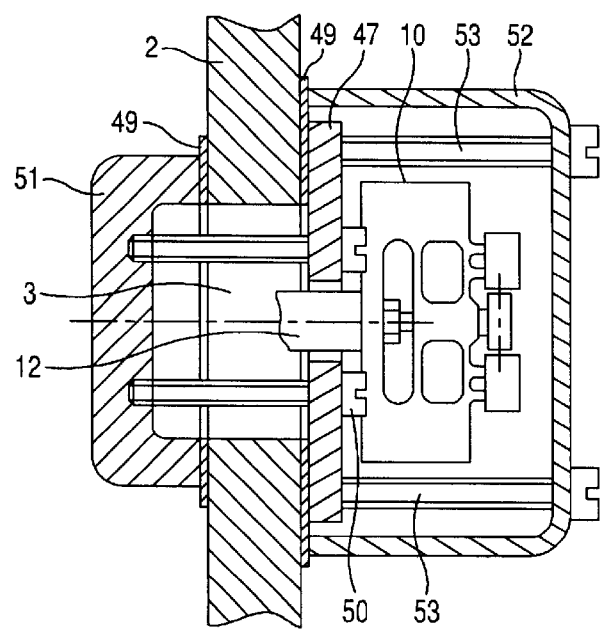

The subject of the invention is more closely explained using the attached drawings. Shown are:

FIG. 1 an outline as a representation of the principles of the method of functioning of the measuring cell, FIG. 2 a modification of the measuring cell of FIG. 1, FIGS. 3a,b,c a three-side view of a first embodiment, FIG. 4 an installation detail, FIG. 5 a second embodiment, FIG. 6 a third embodiment, FIG. 7 a fourth embodiment, FIG. 8 a fifth embodiment, FIG. 9 a sixth embodiment, FIG. 10 a preferred embodiment of a cover cap.

FIG. 1 is a schematic representation of the principles of the measuring cell, without the measuring transformer. A base 1 carries a bearing out rectangular plate 2 with a circular hole 3 applied essentially in the centre. If now a force F considered as a point load acts upon the upper edge of the plate 2 at a point 7, then the plate 2 deforms in a parallelogram under the build up of shear load. The technical build up of the introduction of such forces is well known and is therefore not explained further. The circular hole 3 similarly experiences a deformation and becomes an ellipse 4, whose smaller diameter b becomes smaller than, and its larger diameter a larger than the radius r of the hole 3. The directions of the radii a, b are inclined essentially at 45° to the direction of the neutral surface N of the plate 2, whereby the direction of the force F is essentially perpendicular to the neutral surface N. Thus the build up of shear load in the plate 2 is decisive for the origination of the said elliptical deformation of the hole 3, whose origination is effected by the cross loading working on it.

If the plate 2 —or a carrier, whose web is formed like the plate 2—is supported under the end facing away from the base, that is the free end, then the plate 2 still experiences a bending moment, and the cross loading is reduced according to the distance relationships, as is well known, however in principle nothing changes in the deformation of the hole 3, apart from its amount. This applies even if the plate 2—or the carrier, whose web represents the plate 2—is similarly clamped in a non-rotatable base 1. Instead of a two side clamped carrier a so-called continuous carrier as a part of the measuring cell according to the invention is within the sense of the invention. A modification of FIG. 1 is shown in FIG. 2. Above and below the hole 3 the plate 2 has an additional hole 5; both holes 5 lie in the direction of the shear load component $\tau_{xy}$ above and below the centre of the hole 3. Thereby overall a weakening of the plate cross section is effected and thus an increase in the ratio E=a/b of the ellipse 4 arising from the circular hole 3. This relationship E=a/b is constantly invariant in relation to the place of introduction of the force F, as long as this lies between the piercing point of the tensor component $\tau_{xy}$ through the upper edge of the plate and its outer end; this for the reason that the cross force $Q_y$=F, because no other force diversion is present, apart from the support reaction $F_A$=−F. Obviously it is possible that there is only a single hole 5 or also more than two present, without departing from the sense of the inventive modification.

It is in accordance with the invention to provide an oscillating string measuring transformer as the measuring transducer, which is of itself well known, for instance from CH 672 841. For its installation there are various proposals and modifications: a first modification is shown in FIGS. 3a, b, c.

FIG. 3 shows schematically a measuring transducer 12 with respect to the hole 3. This is clamped in such that its force or displacement measurement direction stands at an angle of essentially 45° both with respect to the tensor component $\tau_{xy}$ and also to the direction of the neutral surface N. This direction of installation applies for all the following embodiments such as shown in FIG. 3a, or orthogonal to it. In the first case quoted, the direction of the shortening, in the second that of the lengthening of the diameter of the hole 3 is measured. The following Figures are each sections or plan views in the 45° plane described.

Figure 3B:
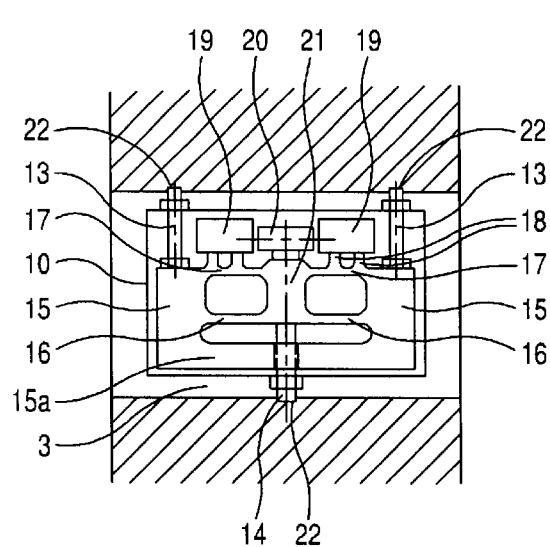

In FIG. 3b the plate is selected to be so thick that an oscillating string measuring transformer 10 according to CH 672 841 can be directly installed.

The oscillating string measuring transformer 10 is at the state of the art. It has three force inputs 13, 14: the two force inputs 13 work on two external immovable supports 15, onto which four leaf springs 16, 17 are hinged and which are joined by a base 15a. The leaf springs 17 shown lying at the top in the drawing carry on each of two supports 18 a string head 19 for the fastening and the tensioning of a string 20.

The third force input 14 works directly on a centre piece 21 on which the leaf springs 16, 17 are hinged. If the lower force input 14 moves in relation to the upper force inputs 13, then the tension and thus the frequency of the string 20 increases or decreases, in accordance with the direction of the relative movement.

The force inputs 13, 14 are set into suitable recesses 22 in the hole 3, as is shown subsequently in FIG. 4.

Figure 3C:
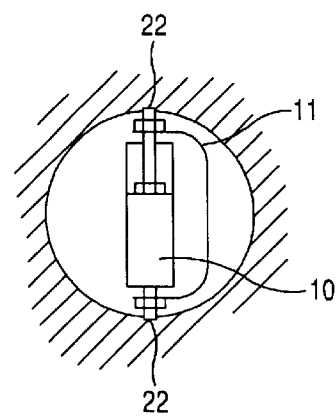

In order to increase the pressure force of the force inputs 13, 14 and to ensure a hysteresis-free seating, a C-shaped pre-loaded spring 11 is provided—as shown in FIG. 3c, which presses the force inputs 13, 14 into the recesses 22, or at least by the force of friction.

Covers, cable lead-ins, electronic devices, which belong to this measuring arrangement, are omitted here; an embodiment of these is shown in FIG. 10.

FIG. 4 shows a recess of this type in section. The recess 22 is produced as a hemispherical cup radially in the wall of the hole 3 in the plate 2, using, for instance, a suitable embossing die. The force inputs—the force input 14 is represented—have for instance a truncated cone shaped end, which fits into the recess 22 without play.

The embodiments according to FIG. 5, 6 are especially suited for the case, where either the plate 2 is too thin or/and the hole 3 is too small for direct installation of a vibrating string measuring transformer according to FIGS. 3a, b, c, without however limiting the type of installation described to this case.

In FIG. 5 the changing of the selected dimension of the hole 3 is transferred to a parallelogram of four rods 23. At their ends, these rods 23 each have a bending link 24. These are joined to two force inputs 25, which are formed in accordance with FIG. 4. As already shown in FIG. 3c, these force inputs 25 are pressed using a pre-tensioned spring 11 into the recesses 22. Two of the rods 23 are connected by bending links 24 to a first hub 26, the others in a similar manner to a second hub 27. This latter is formed as a tube and joined to the base 15a of the oscillating string measuring transformer. The centre piece 21 of the oscillating string measuring transformer 10 is joined by a rod 28 to the first hub 26 and thus transmits its movement to the oscillating string measuring transformer 10. A reduction in the diameter of the hole 3 spreads the said parallelogram and leads to a reduction of the string tension and its frequency, an enlargement to their increase. If the parallelogram of the four rods 23 is selected to be very high as against its width (in the direction of the rod 28), then there results from this a corresponding increase in the measured displacement, given by the trigonometry of angular relationships, as is well known.

In FIG. 6 the deformation of the hole 3 is transmitted via an elastic clip 30, which is also provided with two force inputs 25 for its part, analog to the embodiment in FIG. 5. In FIG. 6 the clip 30 has an upper and a lower arm 31, onto which the said force inputs 25 are attached. Towards the open ends of the clip 30 the arms 31 are for instance rounded off and carry the oscillating string measuring transformer 10 on their ends. To insert the clip 30 into the recesses 22 in the hole 3, they can be pressed together using a suitable tool and inserted, whereafter the clip 30 is allowed to relax, until the force inputs 25 engage in the recesses 22. Here also a displacement translation of the deformation of the hole 3 is created; the clip 30 immediately takes up the necessary application pressure of the force inputs 25 in the recesses 22.

Other solutions are also possible instead of the elastic parallelogram of FIG. 5 and in accordance with the invention. Such a solution is shown in FIG. 7: the displacement conversion here comprises two rods 23; each rod 23 is hinged to an insert 32 via a bending link 24, with which each other is taken to a hub 33 analog to the first hub 26 in FIG. 5. The upper part of the insert 32 in FIG. 7 is formed as a lever 34, which is mounted elastically in a further bending link 35 and carries one of the force inputs 25 at its end carrying the bending link 24 of the one rod 23. The other force input 24 is attached to the lower part of the insert 32 in FIG. 7, where also the other bending link 24 of the other rod 23 terminates.

A rod 36 is fastened into the hub 33, which transmits the movement of the hub to the oscillating string measuring transformer 10 through a hole 37 in the insert 32.

The rear part of the lever 34 facing away from the force input 25 has a boring 40, through which a screw 41 runs, which engages in a thread 39 in the central part of the insert 32. Using this screw 41, the contact force of the force input 25 in the recess 22, and thereby the pre-tensioning of the oscillating string measuring transformer 10, can be adjusted.

As is further shown in FIG. 7, at least one of the force inputs 25 can be made double, so that advantageously in the axial direction of the hole 3 two force inputs 25 are available, whereby the part of the force measuring device inserted into the hole 3 is secured against rotation.

The embodiment according to FIG. 8 has—like that in FIG. 5—a parallelogram of four rods 23 for force and displacement conversion. The rods 23 here are, however, each only provided with one bending link 24 and thereby generate the contact force provided onto the inside of the hole 3 themselves. The hole 3 further carries two grooves 42, running parallel to its axis, which for instance have a V-shaped cross section with a radius on the peak of the V. In these grooves two knife edges 43 engage as force inputs—again with a corresponding radius—whereby the radius of the knife edges 43 is smaller than that of the grooves 42, as is known generally from balance manufacture. The arrangement according to FIG. 8 can be inserted into the hole 3 by pressing, however also by force-free insertion, if it is previously compressed using a suitable tool.

The measuring arrangement according to FIG. 9 can be understood as a modification to that according to FIG. 5. Here, however, the pre-tensioning spring 11 according to FIG. 5 is missing. Furthermore, here, the introduction of force into the measuring arrangement is differently addressed: two blunt ended blind holes are bored parallel to the axis of the hole 3, which are joined to the hole 3, so that two grooves 44 result. At the end of each groove 44 there is provided—not drawn in here—a thread in each case for a screw 45. Instead of a force input 25, as in the previously described embodiments, a grommet 46 is provided, through which the screws 45 can be inserted without play.

FIG. 10 shows a preferred embodiment of an enclosure of the measuring transducer 12. Since it, possibly with small changes in the dimensioning, can be used for all the embodiments, the measuring transducer 12 is only indicated. A, for instance round, disc 47 has a central aperture 48, through which the oscillating string measuring transformer 10 is joined to the measuring transducer 12. The disc 47 is positioned to the side on the plate 2—or the web 2—and separated from it by an isolating and sealing element 49, for instance made of an elastomer. Two first screws 50 pass through the disc 47 and the hole 3 and engage on the other side of the plate 2 in corresponding threads in a first cover cap 51. This is supported on the plate 2 on a similar isolating and sealing element 49. A second cover cap 52 is firmly screwed onto the disc 47 by means of two further screws 53, which pass through it. Energy and data lines are taken for instance through openings—not shown—in the second cover cap 52. Dirt, dust and dampness can thus effectively kept away from the measuring transducer 12 and the oscillating string measuring transformer 10.

What is claimed is:

1. A force measuring cell comprising an essentially level and rectangular plate, which is loaded with a force to be measured in its shearing plane and which has a first circular hole through a neutral plane with respect to this force, whose axis is perpendicular to the neutral plane of the plate and in this first hole a measuring transducer is carried, whereby this first hole, by means of formation of its wall is providing means for positional and gripping force acceptance, comprising:

the plate which is clamped into a base along its edge parallel to the direction of the force to be measured;

the first hole which lies between the edge and impact point of the force to be measured;

the measuring transducer including an oscillating string measuring transformer;

the oscillating string measuring transformer having at least two force inputs;

the wall of the first hole being formed in at least two positions such that the force inputs of the oscillating string measuring transformer is inserted and locked in position and a gripping force is exerted by a pre-tensioning force; and the oscillating string measuring transformer being clamped in the first hole such that the force acting on it is essentially at 45° to the direction of the force to be measured, whereby the oscillating string measuring transformer is measuring the force and deformation displacement of the wall of the first hole.

2. The force measuring cell according to claim 1, further comprising the plate to carry, in addition to the first hole, at least one further circular hole, which is arranged adjacent to the first hole in the direction of the force to be measured.

3. The force measuring cell according to claim 2, comprising the formation of the wall of the first hole for the positional and gripping force acceptance of the measuring transducer to include two hemispherical cup-shaped recesses positioned opposite to each other.

4. The force measuring cell according to claim 3, wherein means of transmission are available to transmit the deformation displacement of the wall of the first hole, to be measured, to the oscillating string measuring transformer arranged outside the first hole.

5. The force measuring cell according to claim 4, wherein the means of transmission comprise a rod with two arms, whereby each arm has at least one force input, to engage into a suitable formation of the first hole; and the arms of the rod are formed at their ends such to accept the oscillating string measuring transformer.

6. The force measuring cell according to claim 4, wherein the transmission means comprise a parallelogram formed from four rods, whereby the rods are each joined by a bending link to the two force inputs of the oscillating string measuring transformer;

each two rods are joined to a first hub and a second hub by means of bending links;

the force and movement of the first hub is transmitted by a rod; and the force and movement of the second hub is transmitted directly to the oscillating string measuring transformer.

7. The force measuring cell according to claim 3, wherein the oscillating string measuring transformer has force inputs, which are configured such that they are locked into position in the formation of the wall of the first hole.

8. The force measuring cell according to claim 7, wherein a pre-loaded spring is present, which presses the force inputs into the formation of the wall of the first hole.

9. The force measuring cell according to claim 2, comprising the formation of the wall of the first hole for the positional and gripping force acceptance of the measuring transducer to include three hemispherical cup-shaped recesses positioned opposite to each other, whereby two of these recesses lie on the same surface line of the first hole.

10. The force measuring cell according to claim 9, wherein means of transmission are available to transmit the deformation displacement of the wall of the first hole, to be measured, to the oscillating string measuring transformer arranged outside the first hole.

11. The force measuring cell according to claim 10, wherein the transmission means comprise an insert to be clamped into the first hole with at least two force inputs, whereby the insert has a first bending link; onto which one force input is linked onto each of the at least two force inputs lying opposite to each other in the first hole, a rod is linked in each case by a first bending link the two other ends of the rods carry a rear hub by means of a further bending link in each case;

the axes of the two rods form an angle between 90° and 180°;

the rear hub is joined by means of a rod lying in the bisecting angle of the axes of the rods to one of the force inputs of the oscillating string measuring transformer, whilst the other hub is joined directly to the insert; and the insert has further a lever fastened to the first bending link, which has a boring running essentially perpendicular to the axis of the lever, the insert carries further a thread applied coaxially with this boring, to accept a screw to be inserted through the boring into the thread, with the aid of which screw the tension of the lever and thus the contact force of the force inputs on the recesses is adjusted.

12. The force measuring cell according to claim 9, wherein the oscillating string measuring transformer has force inputs, which are configured such that they are locked into position in the formation of the wall of the first hole.

13. The force measuring cell according to claim 12, wherein a pre-loaded spring is present, which presses the force inputs into the formation of the wall of the first hole.

14. The force measuring cell according to claim 2, comprising the formation of the wall of the first said hole to include two V-shaped grooves with rounded recesses, which run opposite to each other parallel to the axis of the first hole.

15. The force measuring cell according to claim 14, wherein means of transmission are available to transmit the deformation displacement of the wall of the first hole, to be measured, to the oscillating string measuring transformer arranged outside the first hole.

16. The force measuring cell according to claim 14, wherein the oscillating string measuring transformer has force inputs, which are configured such that they are locked into position in the formation of the wall of the first hole.

17. The force measuring cell according to claim 16, wherein a pre-loaded spring is present, which presses the force inputs into the formation of the wall of the first hole.

18. The force measuring cell according to claim 1, comprising the formation of the wall to include two grooves with essentially round cross sections, which run opposite to each other with their axes each parallel to the axis of the first hole and are cut out from it, which are further as long as half the thickness of the plate and at their butt ends, each has a thread coaxial with an axis of a groove.

19. The force measuring cell according to claim 18, wherein
   means of transmission are present, which transmit the deformation displacement of the first hole, to be measured, onto the oscillating string measuring transformer arranged outside the first hole;
   the transmission means comprise a parallelogram formed from four rods, whereby the four rods are each connected by a bending link to the two force inputs of the oscillating string measuring transformer;
   each two rods are connected by means of bending links with a first hub and a second hub;
   the force and displacement of the first hub are transmitted via a rod, the force and displacement of the second hub are transmitted directly to the oscillating string measuring transformer; and
   the force inputs are provided with a grommet for the acceptance of a screw, to be tightened in a thread, which is present at a blind end of a groove.

20. The force measuring cell according to claim 18, wherein the oscillating string measuring transformer has force inputs, which are configured such that they are locked into position in the formation of the wall of the first hole.

21. The force measuring cell according to claim 20, wherein a pre-loaded spring is present, which presses the force inputs into the formation of the wall of the first hole.

22. The force measuring cell according to claim 1, comprising the formation of the wall of the first hole for the positional and gripping force acceptance of the measuring transducer to include two hemispherical cup-shaped recesses positioned opposite to each other.

23. The force measuring cell according to claim 22, wherein means of transmission are available to transmit the deformation displacement of the wall of the first hole, to be measured, to the oscillating string measuring transformer arranged outside the first hole.

24. The force measuring cell according to claim 23, wherein
   the means of transmission comprise a rod with two arms, whereby each arm has at least one force input, to engage into a suitable formation of the first hole; and
   the arms of the rod are formed at their ends such to accept the oscillating string measuring transformer.

25. The force measuring cell according to claim 22, wherein the oscillating string measuring transformer has force inputs which are configured such that they are locked into position in the formation of the wall of the first hole.

26. The force measuring cell according to claim 25, wherein a pre-loaded spring is present, which presses the force inputs into the formation of the wall of the first hole.

27. The force measuring cell according to claim 23, wherein
   the transmission means comprise a parallelogram formed from four rods, whereby the rods are each joined by a bending link to the two force inputs of the oscillating string measuring transformer;
   each two rods are joined to a first hub and a second hub by means of bending links;
   the force and movement of the first hub is transmitted by a rod; and
   the force and movement of the second hub is transmitted directly to the oscillating string measuring transformer.

28. The force measuring cell according to claim 1, comprising the formation of the wall of the first hole for the positional and gripping force acceptance of the measuring transducer to include three hemispherical cup-shaped recesses positioned opposite to each other, whereby two of these recesses lie on the same surface line of the said first hole.

29. The force measuring cell according to claim 28, wherein means of transmission are available to transmit the deformation displacement of the wall of the first hole, to be measured, to the oscillating string measuring transformer arranged outside the first hole.

30. The force measuring cell according to claim 28, wherein the oscillating string measuring transformer has force inputs, which are configured such that they are locked into position in the formation of the wall of the first hole.

31. The force measuring cell according to claim 30, wherein a pre-loaded spring is present, which presses the force inputs into the formation of the wall of the first hole.

32. The force measuring cell according to claim 29, wherein
   the transmission means comprise an insert to be clamped into the first hole with at least two force inputs, whereby the insert has a first bending link, onto which one force input is linked; onto each of the at least two force inputs lying opposite to each other in the first hole, a rod is linked in each case by a bending link, the two other ends of the rods carry a rear hub by means of a further bending link in each case;
   the axes of the two rods form an angle between 90° and 180°;
   the rear hub is joined by means of a rod lying in the bisecting angle of the axes of the rods to one of the force inputs of the oscillating string measuring transformer, whilst the other hub is joined directly to the insert; and
   the insert has further a lever fastened to the first bending link, which has a boring running essentially perpendicular to the axis of the lever, the insert carries further a thread applied coaxially with this boring, to accept a screw to be inserted through the boring into the thread, with the aid of which screw the tension of the lever and thus the contact force of the force inputs on the recesses is adjusted.

33. The force measuring cell according to claim 1, comprising the formation of the wall of the first hole to include two V-shaped grooves with rounded recesses, which run opposite to each other parallel to the axis of the first hole.

34. The force measuring cell according to claim 33, wherein means of transmission are available to transmit the deformation displacement of the wall of the first hole, to be measured, to the oscillating string measuring transformer arranged outside the first hole.

35. The force measuring cell according to claim 33, wherein the oscillating string measuring transformer has force inputs, which are configured such that they are locked into position in the formation of the wall of the first hole.

36. The force measuring cell according to claim 35, wherein a pre-loaded spring is present, which presses the force inputs into the formation of the wall of the first hole.

37. The force measuring cell according to claim 2, comprising the formation of the wall to include two grooves with essentially round cross section, which run opposite to each other with their axes each parallel to the axis of the first hole and are cut out from it, which are further as long as half the thickness of the plate and at their butt ends each has a thread coaxial with an axis of the groove.

38. The force measuring cell according to claim 37, wherein means of transmission are available to transmit the deformation displacement of the wall of the first hole, to be measured, to the oscillating string measuring transformer arranged outside the first hole.

39. The force measuring cell according to claim 37, wherein the oscillating string measuring transformer has force inputs, which are configured such that they are locked into position in the formation of the wall of the first hole.

40. The force measuring cell according to claim 37, wherein a pre-loaded spring is present, which presses the force inputs into the formation of the wall of the first hole.

41. The force measuring cell according to claim 37, wherein means of transmission are present, which transmit the deformation displacement of the first hole, to be measured, onto the oscillating string measuring transformer arranged outside the first hole;

the transmission means comprise a parallelogram formed from four rods, whereby the four rods are each connected by a bending link to the two force inputs of the oscillating string measuring transformer;

each two rods are connected by means of bending links with a first hub and a second hub;

the force and displacement of the first hub are transmitted via a rod, the force and displacement of the second hub are transmitted directly to the oscillating string measuring transformer; and the force inputs are provided with a grommet for the acceptance of a screw, to be tightened in a thread, which is present at a blind end of a groove.

42. The force measuring cell according to claim 1, wherein the measuring transducer has an enclosure, which comprises a first and a second covering cap, a disc with a central opening and two holes, two isolating and sealing elements, and two first and two further screws;

the enclosure is constructed such that the disc, lying on the first isolating and sealing element, on the one side of the plate is designed such that its central opening comes to lie concentrically over the hole in the plate;

the two first screws are inserted through the holes in the disc, so that they each can engage in a thread in the first cover cap, which lies on a second isolating and sealing element on the other side of the plate, and the two first screws press the disc and the first cover cap against the plate; and the second cover cap with the two further screws is screwed on in threads in the disc, whereby the two further screws penetrate the second cover cap and press the second cover cap similarly against the first isolation and sealing element.

43. The force measuring cell according to claim 1, wherein the plate is a web of a carrier.

44. The force measuring cell according to claim 43, wherein the carrier is clamped on both sides in a frame.

45. The force measuring cell according to claim 43, wherein the carrier is clamped on one side, on its free side it only lies upon a frame.

* * * * *

UNITED STATES PATENT AND TRADEMARK OFFICE
CERTIFICATE OF CORRECTION

PATENT NO.   : 6,327,913 B1
DATED         : December 11, 2001
INVENTOR(S)  : Martin Lustenberger et al.

It is certified that error appears in the above-identified patent and that said Letters Patent is hereby corrected as shown below:

<u>Column 1,</u>
Line 19, replace "D3, D4, DS" with -- D3, D4, D5 --

Signed and Sealed this

Twenty-third Day of April, 2002

Attest:

JAMES E. ROGAN
*Attesting Officer*     *Director of the United States Patent and Trademark Office*